(12) United States Patent
Kim et al.

(10) Patent No.: US 10,310,346 B2
(45) Date of Patent: Jun. 4, 2019

(54) LIQUID CRYSTAL DISPLAY HAVING LIGHT VALVE

(71) Applicant: LG DISPLAY CO., LTD., Seoul (KR)

(72) Inventors: Wondoo Kim, Goyang-si (KR); Kibok Park, Seoul (KR); Joondong Lee, Seoul (KR); Kakyung Kim, Goyang-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 15/797,993

(22) Filed: Oct. 30, 2017

(65) Prior Publication Data

US 2018/0120659 A1    May 3, 2018

(30) Foreign Application Priority Data

Oct. 31, 2016 (KR) .................. 10-2016-0142970

(51) Int. Cl.

| | |
|---|---|
| *G02F 1/1362* | (2006.01) |
| *G02F 1/1368* | (2006.01) |
| *G02F 1/1347* | (2006.01) |
| *F21V 8/00* | (2006.01) |
| *G02F 1/1335* | (2006.01) |

(52) U.S. Cl.
CPC ...... *G02F 1/136286* (2013.01); *G02F 1/1368* (2013.01); *G02F 1/13471* (2013.01); *G02B 6/0055* (2013.01); *G02F 1/133528* (2013.01); *G02F 2001/133601* (2013.01); *G02F 2001/136222* (2013.01); *G02F 2201/123* (2013.01)

(58) Field of Classification Search
CPC .................................................. G02F 1/1347
See application file for complete search history.

(56) References Cited

U.S. PATENT DOCUMENTS

| | | | | |
|---|---|---|---|---|
| 2006/0145976 | A1* | 7/2006 | Tsai | G02F 1/13306 345/87 |
| 2007/0242028 | A1* | 10/2007 | Kitagawa | G02F 1/133504 345/100 |
| 2008/0284951 | A1* | 11/2008 | Son | G02F 1/13471 349/96 |
| 2009/0135317 | A1* | 5/2009 | Lynam | G02F 1/133603 349/5 |
| 2014/0049734 | A1* | 2/2014 | Erinjippurath | G09G 3/3611 349/96 |
| 2014/0063428 | A1* | 3/2014 | Lee | G02F 1/13439 349/139 |

FOREIGN PATENT DOCUMENTS

| | | | | | |
|---|---|---|---|---|---|
| CN | 104460087 | * | 3/2015 | ........... | G02F 1/1333 |
| CN | 104460087 A | | 3/2015 | | |
| JP | 2002-221730 | * | 8/2002 | ........... | G02F 1/1343 |

(Continued)

*Primary Examiner* — Sang V Nguyen
(74) *Attorney, Agent, or Firm* — Seed Intellectual Property Law Group LLP

(57) ABSTRACT

The present disclosure relates to a liquid crystal display (or, LCD) including a light valve. The present disclosure provides a liquid crystal display comprising: a back light unit; a light valve panel disposed in front of the back light unit, and including a plurality of first unit pixel areas; and a video display panel disposed in front of the light valve panel, and including a plurality of second unit pixel areas.

7 Claims, 6 Drawing Sheets

(56) References Cited

FOREIGN PATENT DOCUMENTS

| JP | 2007-310376 | * | 11/2007 | ............ | G02F 1/1333 |
| JP | 2016-133633 | * | 7/2016 | ............ | G02F 1/1347 |
| TW | 200624912 | * | 7/2006 | ............. | G02F 1/133 |
| TW | 200624912 A | | 7/2006 | | |
| WO | 2012/148983 A2 | | 11/2012 | | |

* cited by examiner

LIQUID CRYSTAL DISPLAY HAVING LIGHT VALVE

CROSS-REFERENCE TO RELATED APPLICATION

This application claims priority to Republic of Korea Patent Application No. 10-2016-0142970 filed on Oct. 31, 2016, which is incorporated by reference herein in its entirety.

BACKGROUND

Technical Field

The present disclosure relates to a liquid crystal display (or, LCD) including a light valve. Especially, the present disclosure relates to a liquid crystal display having a first liquid crystal display for the light valve and a second liquid crystal display for the video display in which the black and white contrast is enhanced.

Description of the Related Art

Thanks to the characteristics such as the light weight, the thin thickness and the low power consumption, the liquid crystal displays are widely used for various applications. The liquid crystal displays are used for the portable computer, the office automation appliances, the audio/video devices, the commercial displays and so. The most type of the liquid crystal display, the transmittive type liquid crystal display, represents video images by controlling the light transitivity of the liquid crystal layer using the electric fields.

As the representative flat panel display, the liquid crystal displays are applied to various fields. For example, it can be applied to the transparent display which displays the video images when it is activated and shows the background images through the display like the transparent glasses when it is inactivated.

FIG. 1 is a perspective view illustrating the structure of the liquid crystal display according to the related art. The liquid crystal display according to the related art comprises a display panel LCDP and a back light unit BLU. The display panel LCDP includes a first polarization plate PU and a second polarization plate PL which are disposed as their light transmittance axes are crossed each other, and a liquid crystal panel LCP inserted between these two polarization plates PU and PL.

The liquid crystal panel LCP includes an upper substrate SU, a lower substrate SL and a liquid crystal layer LC disposed between these two substrates SU and SL. At the upper outer surface and the lower outer surface of the liquid crystal panel LCP, an upper polarization plate PU and a lower polarization plate PL are attached, respectively. Even though it is not shown in the figure, the upper substrate SU and the lower substrate SL may further include lines and black matrix defining pixel areas disposed in a matrix manner, and a common electrode and a pixel electrode for driving the liquid crystal layer LC. Further, various color filters may be included for representing colors.

The upper polarization plate PU is attached on the outer surface of the upper substrate SU, the lower polarization plate PL is attached on the outer surface of the lower substrate SL. For representing the full black scale, the upper polarization plate PU and the lower polarization plate PL are preferably disposed as their light transmittance axes are perpendicularly crossed each other.

The back light unit BLU is disposed under the display panel LCDP. The back light unit BLU has a light guide plate LG and a light source LS. The light source LS is disposed at one side of the light guide plate LG for radiating the lights into the light guide plate LG. The light guide plate LG distributes the lights received from the light source LS over the whole area of the light guide plate LG and sends most of the lights to the upper surface facing the display panel LCDP. To do so, a reflective pattern may be formed on the lower surface of the light guide plate LG.

The liquid crystal displays are applied to various fields not only for the computer monitor or television set. Recently, the flat panel display is applied to the automobile instrument panel. It is required that the automobile instrument panel provides the various data and information to the driver exactly and visually. Therefore, the display for the automobile instrument panel is preferably not affected by the brightness of the ambient lights, but can exactly present the proper color scale and brightness of the video data.

Further, it may be required that a touch input function is applied to the automobile instrument panel for that the driver can easily and quickly check and/or confirm the various data needs for driving. Any situations are not permitted for causing the deterioration or distortion of the visual data on the instrument panel when conducting the touch operation. The requirement for the flat panel display representing the visual data exactly and stably under any situation is increasing as the liquid crystal display is applied to the various fields.

BRIEF SUMMARY

In order to overcome the above mentioned drawbacks, the purpose of the present disclosure is to provide a liquid crystal display having the superior contrast ratio and the stable full black scale. Another purpose of the present disclosure is to provide a liquid crystal display having the superior video quality without any unexpected noises such as moiré and/or mura under any conditions.

In order to accomplish the above purpose, one embodiment of the present disclosure provides a liquid crystal display comprising: a back light unit; a light valve panel disposed on the back light unit, and including a plurality of first unit pixel areas; and a video display panel disposed on the light valve panel, and including a plurality of second unit pixel areas.

In some embodiments, the second unit pixel areas overlap and are misaligned with respect to the second unit pixel areas.

In some embodiments, the first unit pixel areas have a rhombus shape, and the second unit pixel areas have a quadrate shape.

In some embodiments, the rhombus shape corresponds to a 45-degree rotation of the quadrate shape.

In some embodiments, the first unit pixel areas have a different size than the second unit pixel areas.

In some embodiments, the first unit pixel areas have a size that is within a range of 0.5 times to 2.8 times, inclusive, of a size of the second unit pixel areas.

In some embodiments, the light valve panel includes: a data line extending in a first direction along a first side of the rhombus shape; a gate line extending in a second direction along a second side of the rhombus shape; a thin film transistor disposed at one corner of the rhombus shape; and a pixel electrode connected to the thin film transistor, and disposed within the first unit pixel area.

In some embodiments, the liquid crystal display further comprises a white color filter disposed at the first unit pixel area.

In some embodiments, each of the second unit pixel areas includes a plurality of sub pixel areas.

In some embodiments, the sub pixel areas include: a red sub pixel; a green sub pixel; and a blue sub pixel.

As including a light valve between the display panel and the back light unit, the liquid crystal display according to the present disclosure provides the superior video quality in which the full black scale can be stably presented and the black and white contrast ratio, under any situations and ambient conditions. As the unit pixel of the light valve is disposed as irregularly overlapped with the unit pixel area of the display panel, the liquid crystal display according to the present disclosure has no light noise pattern such as moiré or mura. Further, as the unit pixel of the light valve has different shape and size with the unit pixel area of the display panel, the aperture ratio can be ensured in a maximum value.

BRIEF DESCRIPTION OF THE SEVERAL VIEWS OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

DETAILED DESCRIPTION

Figure 1:
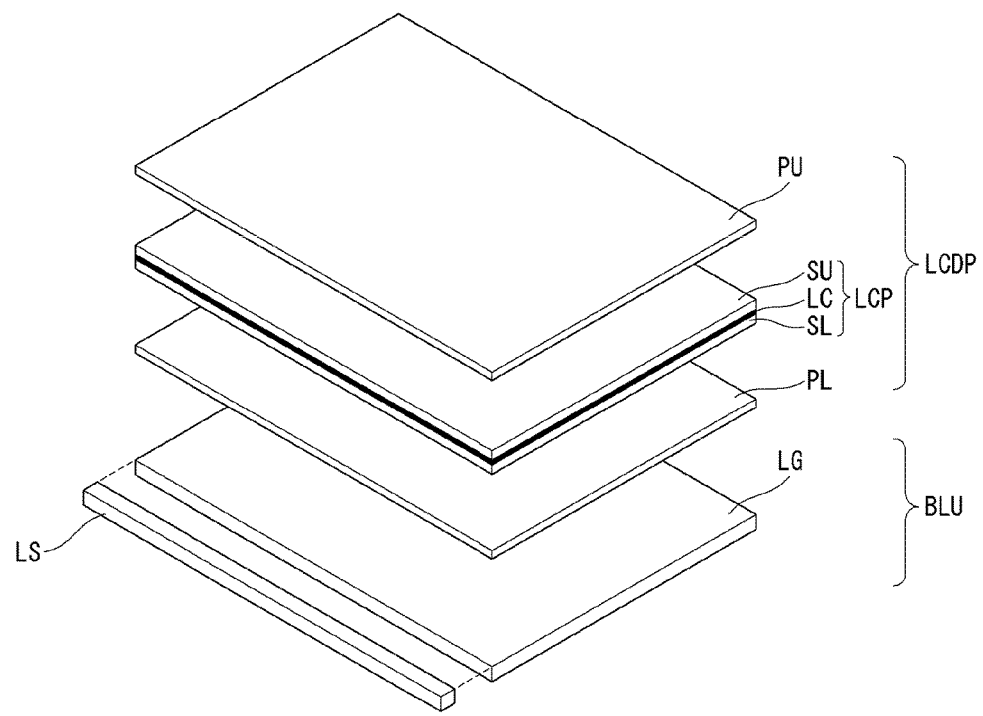
FIG. 1 is a perspective view illustrating the structure of the liquid crystal display according to the related art.

Referring to attached figures, preferred embodiments of the present disclosure will be described. Like reference numerals designate like elements throughout the detailed description. However, the present disclosure is not restricted by these embodiments but can be applied to various changes or modifications without changing the technical spirit. In the following embodiments, the names of the elements are selected for ease of explanation and may be different from actual names.

First Embodiment

Figure 2:
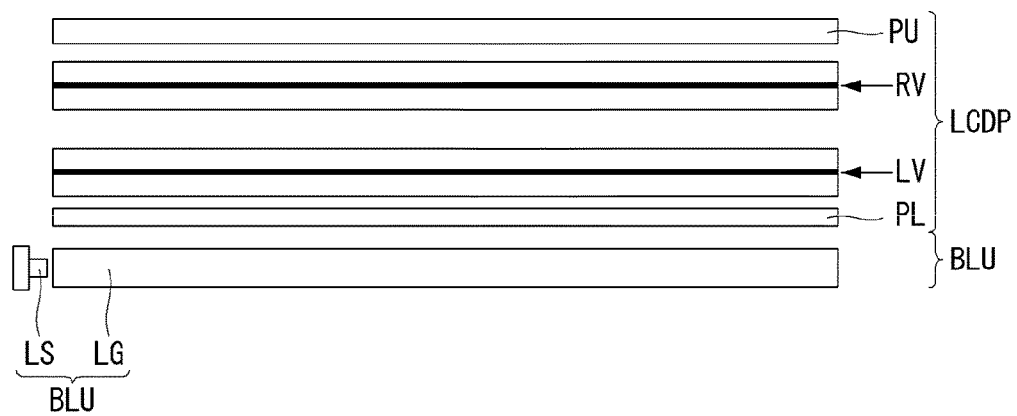
FIG. 2 is a cross-sectional view illustrating a structure of a liquid crystal display having a light valve according to the present disclosure.

Referring to FIG. 2, we will explain about the first preferred embodiment of the present disclosure. FIG. 2 is a cross-sectional view illustrating a structure of a liquid crystal display having a light valve according to the present disclosure. A liquid crystal display having a light valve according to the first embodiment of the present disclosure comprises a display panel LCDP and a back light unit BLU.

The display panel LCDP includes a lower polarization plate PL, a light valve panel LV, a video display panel RV and an upper polarization plate PU. The video display panel RV is disposed on the light valve panel LV.

For the case that the light valve panel LV and the video display panel RV are made of the liquid crystal display panel, the polarization plates are required. For example, the lower polarization plate PL is disposed under the rear surface of the light valve panel LV. The upper polarization plate PU is disposed on the front surface of the video display panel RV.

The back light unit BLU is disposed under the display panel LCP, i.e., under the lower polarization plate PL. The back light unit BLU includes a light guide plate LG and a light source LS. The light source LS is disposed at one side surface of the light guide plate LG to provide lights into the light guide plate LG. The light guide plate LG distributes the lights received from the light source LS over the whole inside volume of the light guide plate LG, and sends the most lights to the upper side facing the display panel LCDP. To do so, a light reflection pattern may be further included at the lower surface of the light guide plate LG.

Here, the back light unit BLU is the edge type back light unit in which the light source LS is placed as facing one side surface of the light guide plate LG. However, the back light unit BLU of the present disclosure is not restricted to the edge type, but may be a direct type back light unit in which the light source is placed under the light guide plate or the diffusion plate. Even though it is not shown in the figure, one or more optical sheet may be disposed on the upper surface of the light guide plate LG for enhancing the light concentration and diffusion abilities.

The light valve LV is for enhancing the black uniformity, that is, the same black scale can be represented with the same (or very similar) value on any area over the display panel LCDP. In addition, it is for enhancing the contrast ratio (or, CR) between the white scale and black scale. Therefore, it is preferable that the light valve panel LV does not have the color filter.

Figure 3:
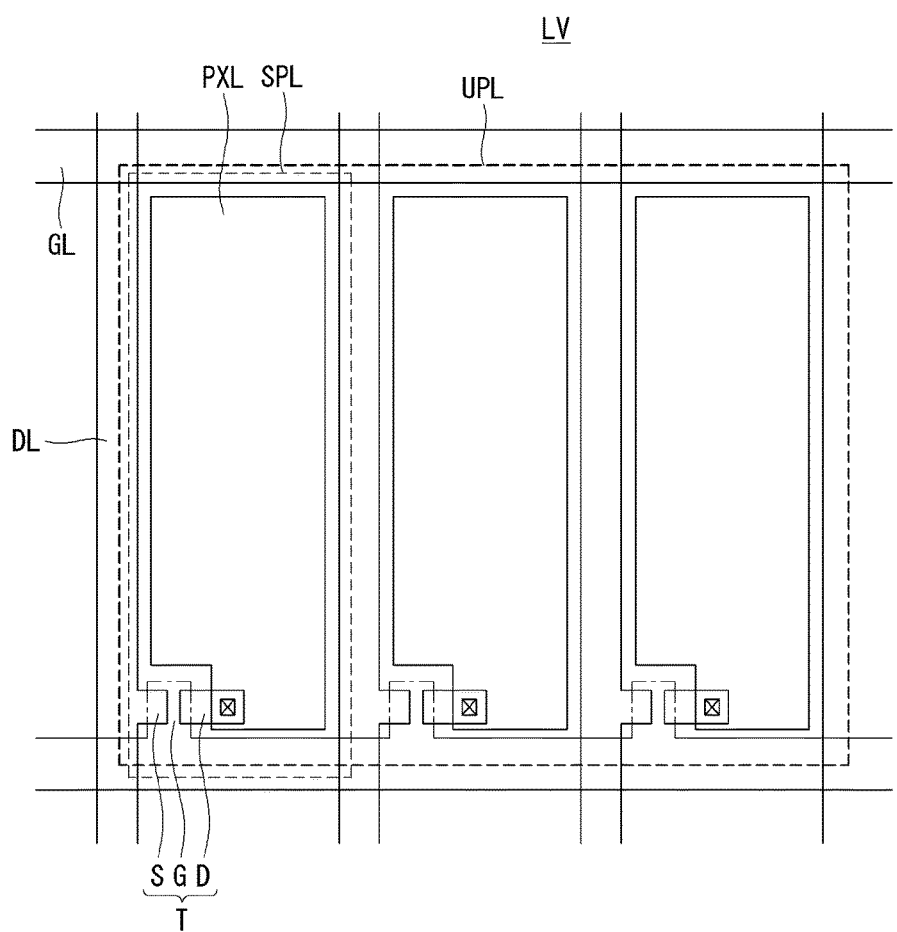
FIG. 3 is a plan view illustrating a structure of a liquid crystal panel for the light valve according to the first embodiment of the present disclosure.

Referring to FIG. 3, we explain the case in which the light valve panel LV is made of the liquid crystal panel. FIG. 3 is a plan view illustrating a structure of a liquid crystal panel for the light valve according to the first embodiment of the present disclosure. On a transparent substrate, a plurality of the unit pixel area UPL is disposed in a matrix manner. The unit pixel area UPL may include three sub pixel areas SPL.

One sub pixel area SPL may be defined by the crossing structure of the gate line GL extending in a first direction (e.g., the horizontal direction as shown in FIG. 3) on the substrate and the data line DL extending in a second direction (e.g., the vertical direction) on the substrate, with the first and second directions being transverse to one another. Within the sub pixel area SPL, a thin film transistor T and a pixel electrode PXL are disposed. The thin film transistor T includes a gate electrode G branched from the gate line GL, a source electrode S branched from the data line DL and a drain electrode D. The pixel electrode PXL is connected to the drain electrode D.

The unit pixel area UPL may have a square shape (or quadrate) in which the horizontal line has the same length as the vertical line. Therefore, the sub pixel area SPL may have the rectangular shape in which ratio of the horizontal line to the vertical line is 1:3.

As the light valve panel LV is for representing various degrees of bright and dark, the color filter is not included in the sub pixel area SPL. All sub pixel area SPL has no color filter. Otherwise, if desired, a white color filter may be disposed in the sub pixel area SPL.

Figure 4:
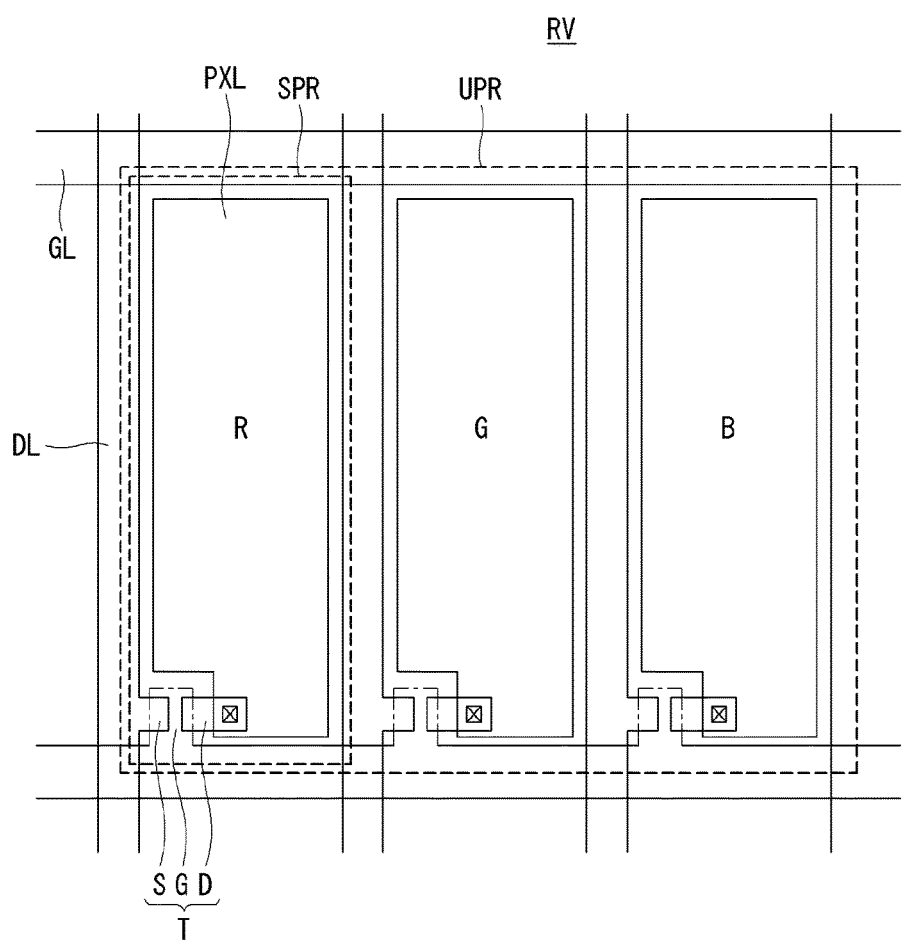
FIG. 4 a plan view illustrating a structure of a liquid crystal panel for the video images according to the first embodiment of the present disclosure.

The video display panel RV is for representing the video data or information. Referring to FIG. 4, we will explain about that the video display panel RV is made of a liquid crystal display. FIG. 4 is a plan view illustrating a structure of a liquid crystal panel for the video images according to the first embodiment of the present disclosure.

The video display panel RV may have the same structure as that of the light valve panel LV. For example, a plurality of unit pixel areas UPR may be disposed on a transparent substrate in a matrix manner. One unit pixel area UPR may have three sub pixel areas SPR.

One sub pixel area SPR may be defined by the crossing structure of the gate line GL extending in the first direction (e.g., the horizontal direction) on the substrate and the data line DL extending in the second direction (e.g., the vertical direction) on the substrate. Within the sub pixel area SPR, a thin film transistor T and a pixel electrode PXL are disposed. The thin film transistor T includes a gate electrode G branched from the gate line GL, a source electrode S branched from the data line DL and a drain electrode D. The pixel electrode PXL is connected to the drain electrode D.

The unit pixel area UPR may have a square or quadrate shape in which the horizontal line has the same length with the vertical line. Therefore, the sub pixel area SPR may have the rectangular shape in which ratio of the horizontal line to the vertical line is 1:3.

As the video display panel RV provides the video images to the observer, it is preferable that the color filters are included. For example, each sub pixel area SPR has one color filter for representing any one color among the red color R, the green color G and the blue color B.

The liquid crystal display having a light valve according to the present disclosure has the structure in which the video display panel RV is stack on the light valve panel LV. For example, each unit pixel area UPL of the light valve LV may be aligned to each unit pixel area UPR of the video display panel RV with one to one correspondence.

In this case, as the unit pixels UPR and UPL having the same shape and size are overlapped each other, the light noise pattern called as moiré or mura may be occurred. These light noise pattern are not related to the video data or information. These may cause confusions or illusions to the observer, so that the observer cannot recognize the correct video information.

Further, as joining the light valve panel LV and the video display panel RV, the unit pixel areas UPR and UPL may be misaligned. In that case, the black matrix disposed between the unit pixel areas UPR or UPL has wider area. That is, due to the alignment tolerance, more aperture areas may be covered by the black matrix so that the aperture ratio may be degraded.

In order to solve or improve the deterioration of the aperture ratio, the unit pixel area UPL of the light valve panel LV may be larger than the unit pixel area UPR of the video display panel RV. For example, the light valve panel LV includes a plurality of the unit pixel areas UPL having 1.2 to 1.5 times, inclusive, larger area than the size of the unit pixel area UPR of the video display panel RV.

In that case, as the light valve panel LV is joined with the video display panel RV, the unit pixel area UPL of the light valve panel LV is not aligned with the unit pixel area UPR of the video display panel RV, but irregularly misaligned with each other. As the unit pixel area UPL of the light valve panel LV has larger area than the unit pixel area UPR of the video display panel RV, the black matrix area may be reduced. That is, the aperture ratio of the video display panel RV would not be lowered.

However, in the structure, the lines of the light valve panel LV are parallel with the lines of the video display panel RV, each other. As the lines having the grid pattern are parallel overlapped, the lights from the back light unit may form light noise pattern such as moiré and/or mura due to the diffraction effect by the grid pattern of the lines.

Second Embodiment

Figure 5:
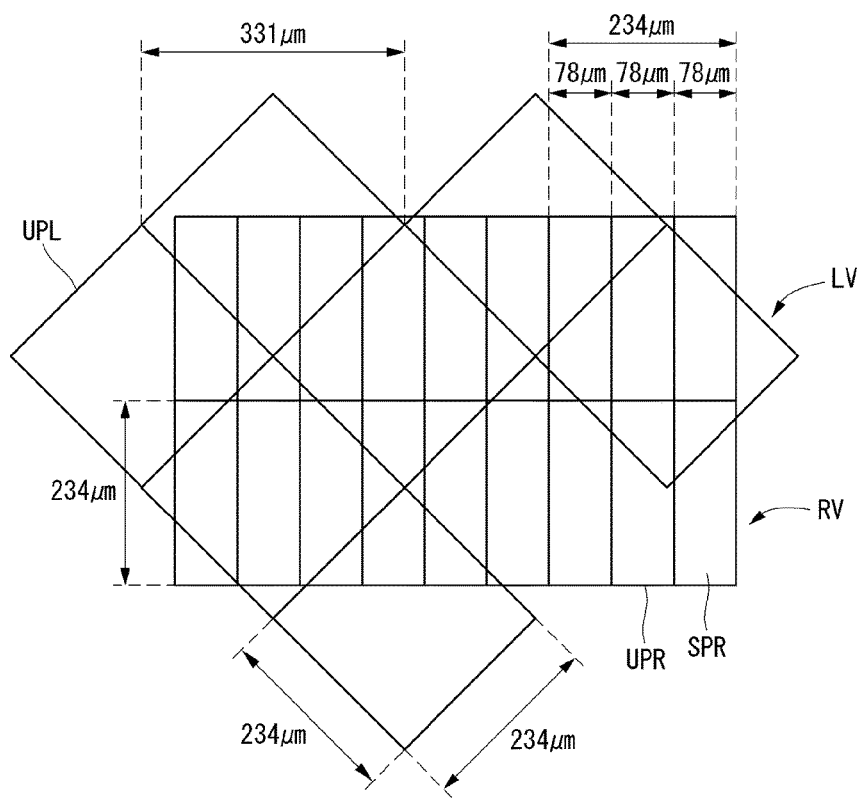
FIG. 5 is a plan view illustrating a placement structure of a liquid crystal panel for the light valve and a liquid crystal panel for the video image in a liquid crystal display having a light valve according to the second embodiment of the present disclosure.

Hereinafter, referring to FIG. 5, we will explain about the second embodiment of the present disclosure. In the second embodiment, a structure is provided of the liquid crystal display having a light valve in which the light noise pattern such as moiré is not occurred and the aperture ratio is not reduced. FIG. 5 is a plan view illustrating a placement structure of a liquid crystal panel for the light valve and a liquid crystal panel for the video image in a liquid crystal display having a light valve according to the second embodiment of the present disclosure. As the structure of the cross sectional view is same with the first embodiment, we may refer to FIG. 2 also.

The liquid crystal display according to the second embodiment of the present disclosure comprises a display panel LCDP and a back light unit BLU. The display panel LCDP includes a lower polarization plate PL, a light valve panel LV, a video display panel RV and an upper polarization plate PU. The video display panel RV is disposed on the light valve panel LV.

For the case that the light valve panel LV and the video display panel RV are made of the liquid crystal display panel, the polarization plates are required. For example, the lower polarization plate PL is disposed under the rear surface of the light valve panel LV. The upper polarization plate PU is disposed on the front surface of the video display panel RV.

The back light unit BLU is disposed under the display panel LCP, i.e., under the lower polarization plate PL. The back light unit BLU includes a light guide plate LG and a light source LS. The light source LS is disposed at one side surface of the light guide plate LG to provide lights into the light guide plate LG. The light guide plate LG distributes the lights received from the light source LS over the whole inside volume of the light guide plate LG, and sends the most lights to the upper side facing the display panel LCDP. To do so, a light reflection pattern may be further included at the lower surface of the light guide plate LG.

The liquid crystal display having a light valve according to the second embodiment has the feature on the joining structure of the light valve panel LV and the video display panel RV. Specifically, the feature is on the structure of the overlapping between the unit pixel area UPL of the light valve panel LV and the unit pixel area UPR of the video display panel RV. In FIG. 5, we illustrate the structure of these unit pixel areas for clearly showing the feature of the second embodiment.

The video display panel RV may have the same structure and may be disposed with the same method as the first embodiment. Here, the description for the detailed structure of the video display panel RV is not duplicated. However, the light valve panel LV may have the different structure from the first embodiment. For example, the light valve panel LV includes a plurality of unit pixel areas having a diamond shape and disposed in a matrix manner. The video display panel RV includes a plurality of unit pixel areas UPR having a quadrate shape and disposed in a matrix manner.

The rhombus unit pixel areas UPL of the light valve panel LV are overlapped with the quadrate unit pixel areas UPR of the video display panel RV. For example, the unit pixel area UPL of the light valve panel LV may have a diamond shape (or, rhombus) of which horizontal diagonal line and the vertical diagonal line are 331 μm (micrometer). As the result, the unit pixel area UPL of the light valve panel LV may be a rhombus that the quadrate of which horizontal line and vertical line are 234 μm (micrometer) is rotated in 45 degree. The unit pixel area UPL of the light valve panel LV may not have the sub pixel areas, but have one pixel body.

The unit pixel area UPR of the video display panel RV may have a quadrate shape of which horizontal line and vertical line are 234 μm (micrometer). The unit pixel area UPR of the video display panel RV may have at least three sub pixel areas SPR. For example, one sub pixel area SPR may have a rectangular shape of which horizontal line is 78 μm (micrometer) and vertical line is 234 μm (micrometer).

As the unit pixel area UPL of the light valve panel LV and the unit pixel area UPR of the video display panel RV has the different shape from each other and overlapped each other, the lights from the back light unit may not be diffracted by the pattern of the unit pixel areas. Therefore, the light noises such as moiré and/or mura caused in the first embodiment are not shown in the second embodiment.

The overlapping or alignment method between the unit pixel area UPL of the light valve panel LV and the unit pixel area UPR of the video display panel RV may be variously defined. For example, any one corner of the rhombus shape in the unit pixel area UPL of the light valve panel LP may be corresponding to any side line of the quadrate shape of the unit pixel area UPR of the video display panel RV. Otherwise, the light valve panel LV is joined with the video display panel RV as one corner of the rhombus may be corresponding to any one corner of the quadrate.

Preferably, the rhombus and the quadrate may be overlapped with any condition, i.e., they are irregularly disposed. For example, one corner of the rhombus of the unit pixel area UPL of the light valve panel LV may be disposed at any point inside of the unit pixel area UPR of the video display panel RV. Instantly, the corner of the rhombus may be disposed at the center of the quadrate. For more preferably, in order to have irregular arrangement, as shown in FIG. 5, one corner of rhombus of the unit pixel area UPL of the light valve panel LV may be disposed as shifting to one side from the center point of the quadrate of the unit pixel UPR of the video display panel RV.

In the above description, in convenience, the rhombus of the unit pixel area UPL of the light valve panel LV has the same size with the quadrate of the unit pixel area UPR of the video display panel RV. However, to prevent the light noise more effectively, the size of the unit pixel area UPL of the light valve panel LV may different from the size of the unit pixel area UPR of the video display panel RV. For example, the size of the unit pixel area UPL of the light valve panel LV may be twice of the size of the unit pixel area UPR of the video display panel RV. Otherwise, the unit pixel area UPL of the light valve panel LV may have any rational number times size than the unit pixel are UPR of the video display panel RV.

In detail, the size of the unit pixel area UPL of the light valve panel LV may be 1.2 to 1.8 times than the size of the unit pixel area UPR of the video display panel RV. Otherwise, the size of the rhombus may be 2.2 to 2.8 times than the size of the quadrate. For other examples, the size of the unit pixel area UPL of the light valve panel LV may be 0.5 to 0.9 times than the size of the unit pixel area UPR of the video display panel RV. The size ratio may be selected any one value among 0.5, 0.7, 0.9, 1.2, 1.5, 1.8, 2.2 or 2.8. That is, considering the manufacturing process and the product application field, the size ratio may be selected between 0.5 times to 2.8 times.

Figure 6:
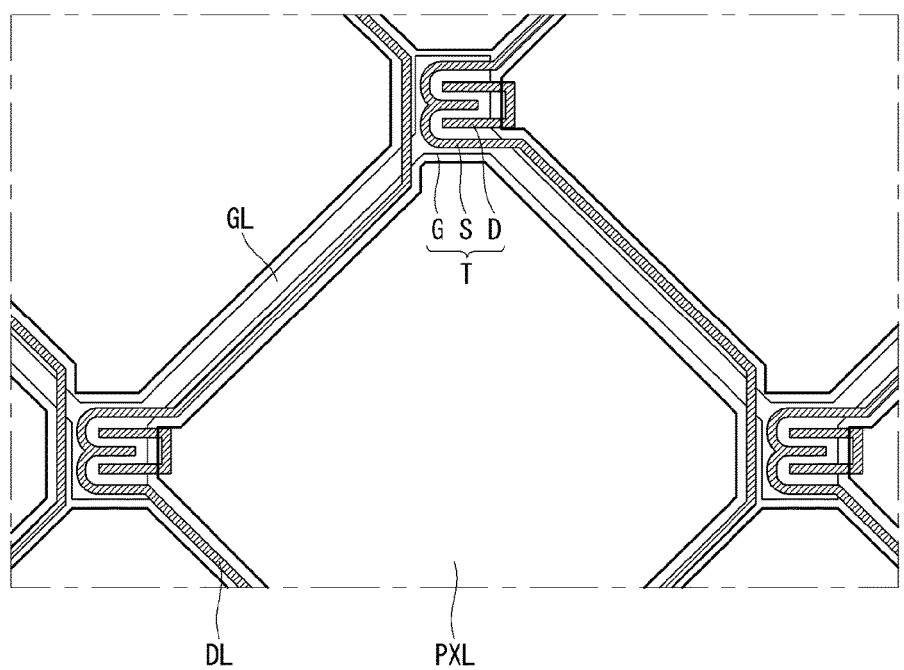
FIG. 6 is a plan view illustrating a structure of the liquid crystal panel for a light valve according to the second embodiment of the present disclosure.

Hereinafter, referring to FIG. 6, we will explain about one example for the light valve panel included in the liquid crystal display according to the second embodiment of the present disclosure. FIG. 6 is a plan view illustrating a structure of the liquid crystal panel for a light valve according to the second embodiment of the present disclosure.

Referring to FIG. 6, the light valve panel according to the second embodiment comprises a plurality of the pixel areas disposed in a matrix manner on a substrate. The pixel area has a diamond or a rhombus shape.

In detail, on the substrate, there are a data line DL extending in a first direction (e.g., vertical direction) and a gate line GL extending in a second direction (e.g., horizontal direction) that is transverse to the first direction. The data line DL has a chevron shape along to the vertically continued sides of the rhombus. That is, as shown FIG. 6, the data line DL extends in a first direction along a side of the rhombus shaped pixel area. Also, the gate line GL has a chevron shape along to the horizontally continued sides of the rhombus. That is, the gate line GL extends in the second direction along a different side of the rhombus shaped pixel area. The thin film transistor T may be located at one corner of the rhombus where the gate line GL and the data line DL are crossed.

The thin film transistor T includes a gate electrode G, a source electrode S and a drain electrode D. The gate electrode G may have a rectangular shape branched from the gate line GL. The source electrode S branched from the data line DL and overlapped with one side portion of the gate electrode G. As shown in FIG. 6, the source electrode S may have 'E' shape. The drain electrode D is disposed as being apart from the source electrode S with a predetermined distance. As shown in FIG. 6, the drain electrode D may have reversed 'C' shape.

The drain electrode D of the thin film transistor T is connected to the pixel electrode PXL. The pixel electrode PXL is disposed within an area surrounded by the data line DL and the gate line GL. The pixel electrode PXL may have the rhombus shape corresponding to the shape of the unit pixel area UPL of the light valve panel LV.

FIG. 6 shows that the thin film transistor T has a small rectangular shape at one corner of the unit pixel area having the rhombus shape. However, the shape of the thin film transistor T is not restricted this shape. For example, the thin film transistor T may have a triangular shape. Otherwise, the thin film transistor T may have a segment shape and be disposed as overlapping with any one side of the rhombus of the unit pixel area UPL of the light valve panel LV. It is preferable that the thin film transistor T of the light valve panel LV has the shape for minimizing the aperture ratio reduction of the video display panel RV. Further, the location of the thin film transistor T of the light valve panel LV may be defined as minimizing the aperture ratio reduction of the video display panel RV.

While the embodiment of the present disclosure has been described in detail with reference to the drawings, it will be understood by those skilled in the art that the disclosure can be implemented in other specific forms without changing the technical spirit or essential features of the disclosure. Therefore, it should be noted that the forgoing embodiments are merely illustrative in all aspects and are not to be construed as limiting the disclosure. The scope of the disclosure is defined by the appended claims rather than the detailed description of the disclosure. All changes or modifications or their equivalents made within the meanings and scope of the claims should be construed as falling within the scope of the disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A liquid crystal display, comprising:
   a back light unit;
   a light valve panel disposed on the back light unit, and including a plurality of first unit pixel areas; and
   a video display panel disposed on the light valve panel, and including a plurality of second unit pixel areas, wherein:
   the first unit pixel areas and the second unit pixel areas overlap and are misaligned with each other;
   the second unit pixel areas have a quadrate shape;
   the first unit pixel areas have a rhombus shape with respect to the second unit pixel areas; and
   one corner of the rhombus shape of each of the first unit pixel areas is disposed as shifted to one side from a center point of the quadrate shape of a respective second unit pixel.

2. The liquid crystal display according to the claim 1, wherein the first unit pixel areas correspond to a 45-degree rotation of the second unit pixel areas.

3. The liquid crystal display according to the claim 1, wherein the first unit pixel areas have a different size than the second unit pixel areas.

4. The liquid crystal display according to the claim 3, wherein the first unit pixel areas have a size that is within a range of 0.5 times to 2.8 times, inclusive, of a size of the second unit pixel areas.

5. The liquid crystal display according to the claim 1, wherein the light valve panel includes:
   a data line extending in a first direction along a first side of the rhombus shape;
   a gate line extending in a second direction along a second side of the rhombus shape;
   a thin film transistor disposed at one corner of the rhombus shape; and
   a pixel electrode connected to the thin film transistor, and disposed within the first unit pixel area.

6. The liquid crystal display according to the claim 1, wherein each of the second unit pixel areas includes a plurality of sub pixel areas.

7. The liquid crystal display according to the claim 6, wherein the sub pixel areas include:
   a red sub pixel;
   a green sub pixel; and
   a blue sub pixel.

* * * * *